UNITED STATES PATENT OFFICE.

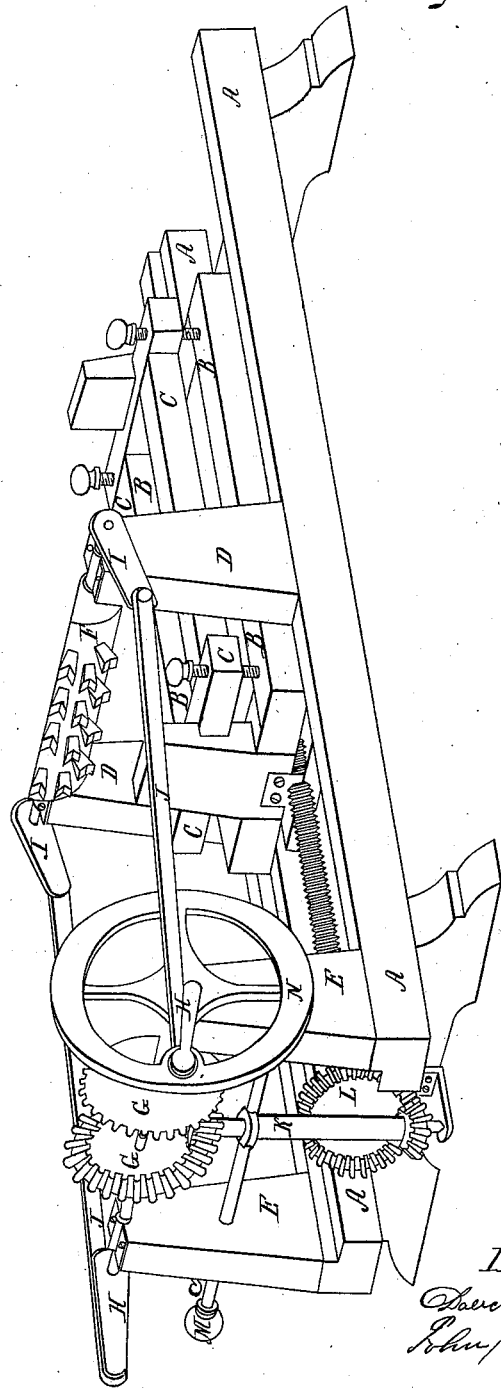

DAVID HULL AND I. CRITCHERSON, OF PORTLAND, MAINE.

MACHINE FOR FACING AND DRESSING STONE.

Specification of Letters Patent No. 191, dated May 8, 1837.

*To all whom it may concern:*

Be it known that we, DAVID HULL and JOHN CRITCHERSON, of the city of Portland, county of Cumberland, and State of Maine, have invented a new and useful Machine for Facing and Dressing Stone; and we do hereby declare that the following is a full and exact description.

A, A, represent the sills of the machine.

B, B, represent the carriage which is moved back and forward in rabbets in the sills.

C, C, represent the frame on which the stone to be dressed is placed, and which is raised by screws in the corners, to bring the stone up to the cutters.

D, D, represent the center posts which hold the shaft and quarter cylinder in which the cutters are placed.

E, E, represent the front posts which hold the revolving shaft to which is attached the bevel gear and cranks for moving the carriage and cutters.

F, represents the quarter cylinder in which are placed the cutters, and which is moved backward and forward in a pendulous motion by the cranks I, I, which are connected by the connecting rods J, J, to the revolving cranks H, H. The pendulous cranks are longer than the revolving cranks, to prevent them from coming up to the dead point.

G, G, represent the bevel gear which operates upon the shaft K, and that upon the bevel gear L, which turns a screw by means of which the carriage, which holds the stone, is moved forward and backward under the cutters.

H, H, represent the revolving cranks which move I, I, the pendulous cranks by means of J, J, the connecting rods.

K, represents the upright shaft which has a bevel cogwheel on each end: the upper one meshing into either of the wheels G, G, by which a forward and backward motion is given to the carriage, and for this purpose is moved from one to the other wheel G, by the slide M.

M, represents the shipper or slide.

N, represents the fly or balance wheel which gives regularity and impetus to the machine, and is attached to the revolving shaft, and made of cast iron.

The frame of the machine is to be made of strong timber, and also the carriage. The machine is to be from eight to twenty feet long, from two to four feet wide and four feet high, and all, excepting what is called the frame, is to be made of iron. The cutters are to be made of steel, to have two edges and by their vibratory motion will sharpen themselves: they are placed in the quarter cylinder so as to interlock or break joints, and thereby to produce a smooth surface upon the stone. The frame, which is raised by screws, is kept in its place by a post at each end, which is let in to a notch in the end pieces of the frame. The posts are framed into the carriage. The cutters are kept in their places by screw nuts or keys on the concave side of the quarter cylinder.

What we claim as our invention and desire to secure by Letters Patent is—

The double-edged cutters placed upon a segment of a cylinder having a pendulous motion for cutting and dressing stone substantially as set forth in the specification.

DAVID HULL.
JOHN CRITCHESON.

Witnesses:
SAMUEL STAPLES,
CHARLES HARDING.